(12) United States Patent
Ferlitsch et al.

(10) Patent No.: US 8,587,425 B2
(45) Date of Patent: Nov. 19, 2013

(54) METHODS, SYSTEMS AND APPARATUS FOR POWER MANAGEMENT

(75) Inventors: Andrew Rodney Ferlitsch, Camas, WA (US); Basil Isaiah Jesudason, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 204 days.

(21) Appl. No.: 13/283,206

(22) Filed: Oct. 27, 2011

(65) Prior Publication Data

US 2013/0110302 A1      May 2, 2013

(51) Int. Cl.
*G08B 5/24*          (2006.01)

(52) U.S. Cl.
USPC ........... 340/500; 340/538; 340/540; 340/603; 340/612; 340/618; 340/679; 340/3.1; 700/295; 700/296

(58) Field of Classification Search
USPC ........... 340/500, 538, 540, 3.1, 5.1, 603, 612, 340/618, 679; 700/295, 296
See application file for complete search history.

(56) References Cited

U.S. PATENT DOCUMENTS

| 6,828,695 | B1 | 12/2004 | Hansen |
| 6,906,617 | B1 | 6/2005 | Van der Meulen |
| 2008/0272934 | A1* | 11/2008 | Wang et al. ............. 340/870.11 |
| 2009/0077397 | A1 | 3/2009 | Shnekendorf et al. |
| 2010/0289643 | A1* | 11/2010 | Trundle et al. ............ 340/545.1 |

FOREIGN PATENT DOCUMENTS

EP          1967923 A2     9/2008

OTHER PUBLICATIONS

R. K. Harle and A. Hopper, "The Potential for Location-Aware Power Management," UbiComp '08 Proceedings of the 10th international conference on Ubiquitous computing, Sep. 2008, pp. 1-10, NY, USA.

* cited by examiner

*Primary Examiner* — Tai T Nguyen
(74) *Attorney, Agent, or Firm* — Kristine Elizabeth Matthews; David C. Ripma (57)         ABSTRACT

Aspects of the present invention are related to systems, methods and apparatus for monitoring and controlling energy usage. Alert notifications may be generated based on a current power status of an energy-consuming device and location information of a mobile device associated with the energy-consuming device.

22 Claims, 4 Drawing Sheets

METHODS, SYSTEMS AND APPARATUS FOR POWER MANAGEMENT

RELATED REFERENCES

U.S. patent application Ser. No. 12/895,422, entitled "Monitoring and Controlling Energy in an Office Environment," filed on Sep. 30, 2010, invented by Basil Isaiah Jesudason, Craig Thompson Whittle, Mary Louise Bourret and Andrew Rodney Ferlitsch, is hereby incorporated herein by reference in its entirety.

FIELD OF THE INVENTION

Embodiments of the present invention relate generally to methods, systems and apparatus for power management and, in particular, to methods, systems and apparatus for monitoring and controlling the energy consumption of an appliance.

BACKGROUND

Historically, an electronic appliance, for example, a home appliance, an office appliance or another electronic appliance, has been a standalone device that did not communicate its operational status to a monitoring, a controlling or an information-gathering process. Thus, determination of the operational status of the appliance, while not co-located with the appliance, has been difficult.

Many modern appliances may be equipped with power-usage sensors, from which information regarding the power usage of an appliance may be gathered and transmitted.

Methods, systems and apparatus for effectively monitoring and controlling the energy consumption of an appliance may be desirable.

SUMMARY

Some embodiments of the present invention comprise methods, systems and apparatus for monitoring and controlling the energy consumption of an appliance.

According to a first aspect of the present invention, alert notification may be based on current power usage and location information.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Historically, an electronic appliance, for example, a home appliance, an office appliance or another electronic appliance, has been a standalone device that did not communicate its operational status to a monitoring, a controlling or an information-gathering process. Thus, determination of the operational status of the appliance, while not co-located with the appliance, has been difficult.

Many modern appliances may be equipped with power-usage sensors, from which information regarding the power usage of an appliance may be gathered and transmitted.

Methods, systems and apparatus for effectively monitoring and controlling the energy consumption of an appliance may be desirable.

Figure 1:
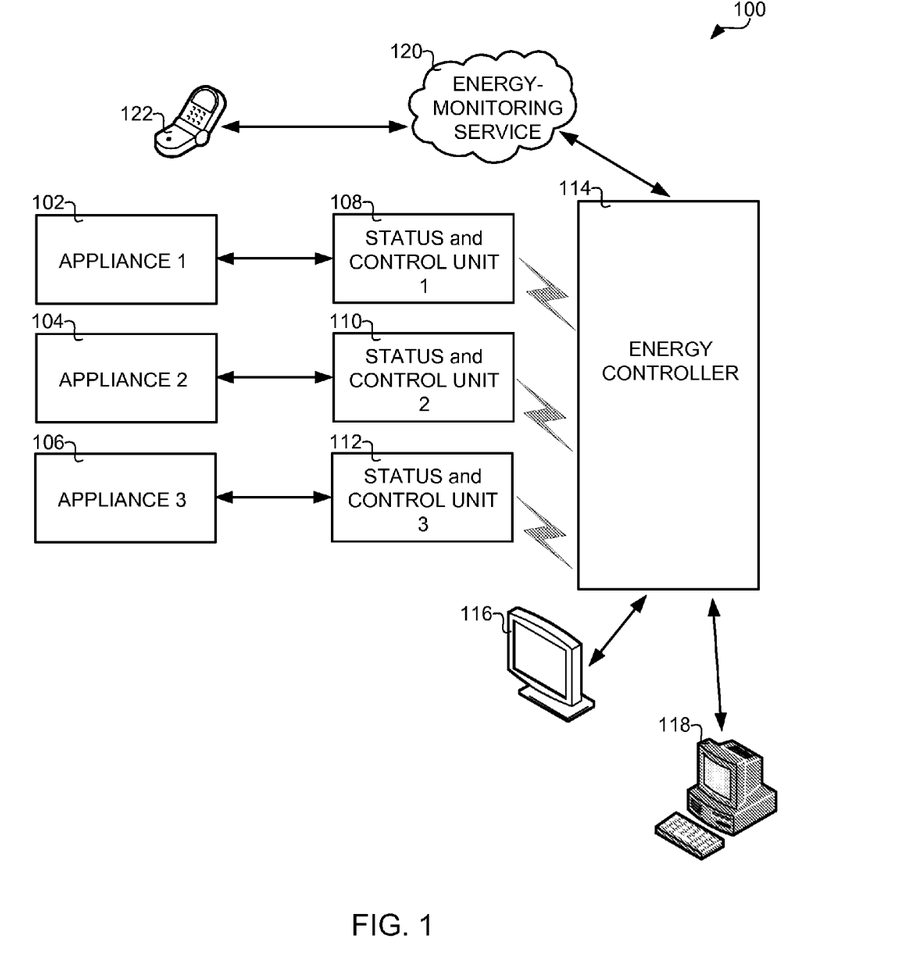
FIG. 1 is a picture depicting exemplary operating environments in which the disclosed systems, methods and apparatus for monitoring and controlling the power status of an energy-consuming device may be used.

Some embodiments of the present invention may be understood in relation to an exemplary operating environment 100 illustrated in FIG. 1. One, or more (three shown), energy-consuming appliances, also considered energy-consuming devices, 102, 104, 106 may transmit real-time power-usage information through an associated status and control unit 108, 110, 112 to an energy controller 114. An appliance may be referred to as an energy-consuming appliance if the appliance is capable of energy consumption, whether or not the appliance may be in a current state of energy consumption. The real-time power-usage information also may be sent to a display device. Exemplary display devices may include a locally attached, to the energy controller 114, display 116, a control and monitor terminal 118, for example, a personal computer communicatively coupled via the Internet, and a display on a mobile device 122 communicatively coupled via the Internet or a cellular-phone service. Exemplary mobile devices include cellular telephones, in-vehicle communication devices, wherein a communication device may be built into a vehicle, in-transportation communication devices, wherein a communication device may be built into a transportation medium, a virtualized mobile device, for example, a computer system existing in a cloud and accessed through an arbitrary personal or a public dumb device, and other mobile communication devices. An exemplary virtualized mobile device may be a Chromebook device. The energy controller 114 also may be communicatively coupled, via a wired, wireless or other communication link, to an energy-monitoring service 120, realized on a cloud-based computing system or other remote server, which may be further communicatively coupled, via a wired, wireless or other communication link, to the mobile device 122. Exemplary communication links include a serial communication link via a serial port, a USB link, an Ethernet link, an Internet link, a cellular service link and other wired, wireless and power link communication links.

In alternative embodiments of the present invention, one, or more, of the display devices may not be present.

In some embodiments of the present invention, the energy-monitoring service 120 may be configured to communicate an alert notification from the energy controller 114 to the mobile device 122. In some embodiments, the alert notification may be a text notification. In alternative embodiments, the alert notification may be an audible notification. In alternative embodiments, the alert notification may be a visual notification. In yet alternative embodiments, the alert notification may be a vibratory notification. In still alternative embodiments, the alert notification may be a combination of notification types, for example, text, audible, visual, vibratory and other notification types. In some embodiments of the present invention, the alert notification may be sent from the energy-monitoring service 120 to the mobile device 122 using a cell service, for example, Short Message Service (SMS) or another cell-based service. In alternative embodiments of the present invention, the alert notification may be sent via the Internet, for example, through a mobile application, or other Internet-based communication, running on the mobile device 122.

In some embodiments of the present invention, the mobile device 122 may run a first mobile application, whereby the first mobile application may display a real-time power-usage value associated with an appliance, or appliances. In some embodiments of the present invention, the mobile device 122 may run a second mobile application, whereby the second mobile application may display an identification of appliances currently consuming power. In some embodiments of the present invention, the mobile device 122 may run a third mobile application, whereby the third mobile application may effectuate a change in power status of one or more appliances. In some embodiments of the present invention, the mobile device 122 may run a fourth mobile application comprising one, or more, of the functions of the first, second and third mobile applications.

In some embodiments of the present invention, the mobile device 122 may access location-aware information, for example, Global Positioning System (GPS) data, for example, GPS coordinates, and address-based location information, for example, via an Internet look-up using a Google Maps API or other map-based address look-up application.

Figure 2:
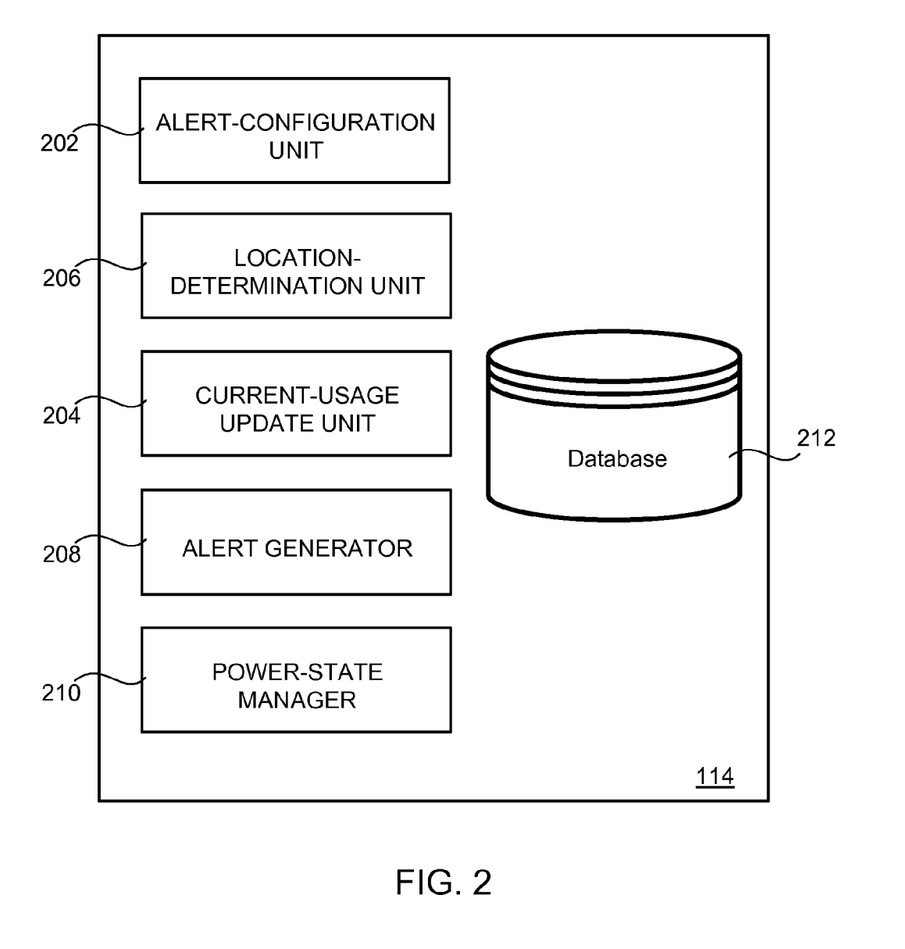
FIG. 2 is a picture depicting exemplary embodiments of an energy controller according to embodiments of the present invention.
Figure 3:
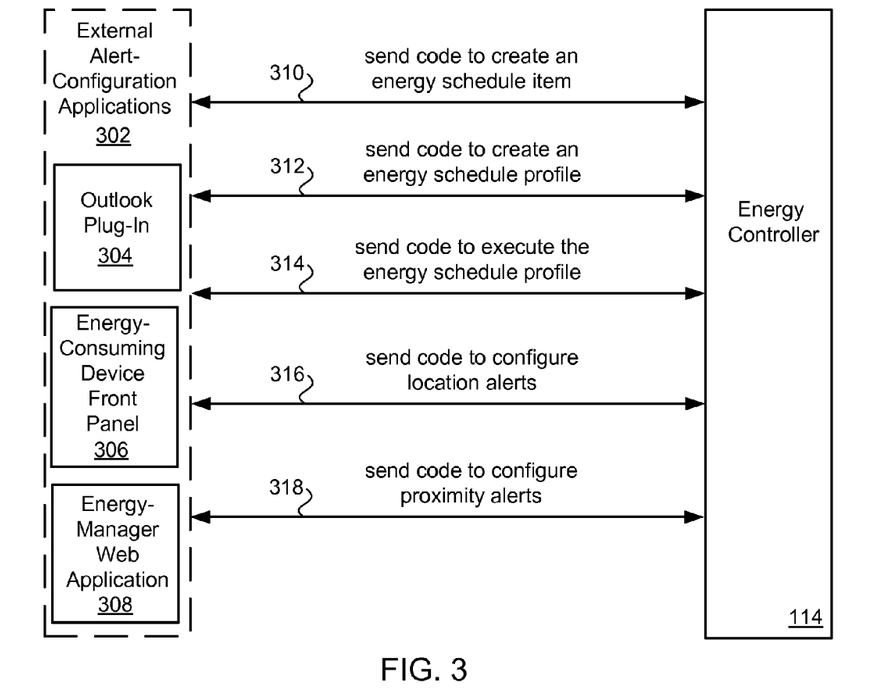
FIG. 3 is a picture illustrating exemplary embodiments of the present invention comprising alert configuration between an energy controller and external alert-configuration applications.

Some embodiments of the present invention may be described in relation to FIG. 2 and FIG. 3. In these embodiments, an energy controller 114 may comprise an alert-configuration unit 202 for configuring an alert condition associated with an energy-consuming appliance. The alert-configuration functionality on the energy controller 114 may be programmatic, for example, web-service based, in some embodiments of the present invention. In alternative embodiments, the alert-configuration functionality on the energy controller 114 may be user-interface (UI) based, for example, using an energy-manager web application. External alert-configuration applications (three shown) 302, for example, an Outlook plug-in 304, a energy-consuming-appliance front-panel application 306, an energy-manager web application 308 and other external applications, may effectuate alert configurations. The alert-configuration unit 202 may present a configuration/setting user interface (UI) for the energy-consuming appliance. An alert may be an automated process that sends a notification to a user in real-time.

In some embodiments of the present invention understood in relation to FIG. 3, a web service may facilitate alert configuration by sending 310 code to create an energy schedule item. An exemplary application call may be of the form:

CreateEnergyScheduleItem(energyScheduleName, pcIPAddress, startTime, endTime, energyState), where energyScheduleName denotes an alias for an energy schedule item to facilitate search and identification, pcIPAddress denotes a communication address for an energy controller, which may be applied to all energy-consuming appliances controlled by the energy controller, startTime and endTime denote a date and/or time when an energy-consumption change event may start and end, respectively, and energyState denotes an energy-consumption state of a device during the period of the energy-consumption change event, for example, "power on," "power off," "sleep," "deep-sleep" and other energy-consumption change events. In alternative embodiments, pcIPAddress may denote a communication address specific to an energy-consuming appliance. In some embodiments of the present invention, pcIPAddress may be formed as a combination of an energy-controller address and an appliance identifier.

In some embodiments of the present invention understood in relation to FIG. 3, a web service may facilitate alert configuration by sending 312 code to create an energy schedule profile, where a profile may define conditions for an energy change event to reoccur, for example, during working hours every Monday through Friday. An exemplary application call may be of the form:

CreateEnergyScheduleProfile(energyProfileScheduleName, pcIPAddress, startTime, endTime, energyState, ProfileType), where energyProfileScheduleName denotes an alias for a profile schedule to facilitate search and identification, pcIPAddress denotes a communication address for an energy controller, which may be applied to all energy-consuming appliances controlled by the energy controller, startTime and endTime denote a date and/or time when an energy-consumption change event may start and end, respectively, energyState denotes an energy-consumption state of a device during the period of the energy-consumption change event, for example, "power on," "power off," "sleep," "deep-sleep" and other energy-consumption change events and profileType denotes the profile information for which to schedule energy-consumption change events. In alternative embodiments, pcIPAddress may denote a communication address specific to an energy-consuming appliance. In some embodiments of the present invention, pcIPAddress may be formed as a combination of an energy-controller address and an appliance identifier.

In some embodiments of the present invention understood in relation to FIG. 3, a web service may facilitate alert configuration by sending 314 code to execute an energy schedule profile. An exemplary application call may be of the form:

ExecuteProfile(profileType, pcIPAddress), where profileType denotes the profile information for which to schedule energy-consumption change events and pcIPAddress denotes a communication address for an energy controller, which may be applied to all energy-consuming appliances controlled by the energy controller. In alternative embodiments, pcIPAddress may denote a communication address specific to an energy-consuming appliance. In some embodiments of the present invention, pcIPAddress may be formed as a combination of an energy-controller address and an appliance identifier.

In some embodiments of the present invention understood in relation to FIG. 3, a web service may facilitate alert configuration by sending 316 code configure a location alert. An exemplary application call may be of the form:

ConfigureLocationAlerts(applianceID, pcIPAddress, alertType, energyThreshold, phoneNumber), where applianceID denotes a communication address, or other identifier, associated with an energy-consuming appliance, pcIPAddress denotes a communication address for an energy controller, which may be applied to all energy-consuming appliances controlled by the energy controller, alertType denotes a type of alert to send, for example, a current-state-of-power-usage alert, a mobile-device-location-information alert, a combination of a power-usage and a location-information alert, and other alert types, energyThreshold denotes a discrete threshold value for an energy consumption rate that triggers an alert when the energy-consumption rate meets a criterion with respect to the threshold value, for example, rises above or falls below, and phoneNumber denotes a communication address associated with a mobile device to which the alert may be sent, for example, a phone number or other communication address. In alternative embodiments, pcIPAddress may denote a communication address specific to an energy-consuming appliance. In some embodiments of the present invention, pcIPAddress may be formed as a combination of an energy-controller address and an appliance identifier.

In some embodiments of the present invention understood in relation to FIG. 3, a web service may facilitate alert configuration by sending 316 code configure a proximity alert. A proximity alert may be triggered based on the distance, as determined by Bluetooth signal strength, a mobile device is from a particular location. An exemplary application call may be of the form:

ConfigureProximityAlerts(applianceID, pcIPAddress, alertType, energyThreshold, phoneNumber,bluetoothSignalStrength), where applianceID denotes a communication address, or other identifier, associated with an energy-consuming appliance, pcIPAddress denotes a communication address for an energy controller, which may be applied to all energy-consuming appliances controlled by the energy controller, alertType denotes a type of alert to send, for example, a current-state-of-power-usage alert, a mobile-device-location-information alert, a combination of a power-usage and a location-information alert, and other alert types, energyThreshold denotes a discrete threshold value for an energy consumption rate that triggers an alert when the energy-consumption rate meets a criterion with respect to the threshold value, for example, rises above or falls below, phoneNumber denotes a communication address associated with a mobile device to which the alert may be sent, for example, a phone number or other communication address and bluetoothSignalStrength denotes a discrete threshold value of a Bluetooth signal strength that triggers an alert when the Bluetooth signal strength associated with the mobile device to which the alert may be sent meets a criterion with respect to the threshold, for example, when the signal strength falls below the threshold. In alternative embodiments, pcIPAddress may denote a communication address specific to an energy-consuming appliance. In some embodiments of the present invention, pcIPAddress may be formed as a combination of an energy-controller address and an appliance identifier.

In some embodiments of the present invention, an alert may be configured to generate and send an alert notification when an energy-consuming appliance, for which the alert is configured, is using power. In some embodiments of the present invention, an alert may be configured to send an alert notification when the energy-consuming appliance is in an "awake" mode. The power mode may be determined by the current power draw which may be monitored by a current-usage update unit 204. The current-usage update unit 204 may record transmitted power-usage information from a status and control unit associated with an energy-consuming appliance. The current-usage update unit 204 may periodically poll the status and control units associated with the energy-consuming appliances for current power-usage readings.

In some embodiments of the present invention, an alert condition may be based on location conditions associated with the mobile device to which an alert notification may be sent.

One exemplary location condition may be related to a primary-site location condition associated with a device to which an alert notification may be sent. During alert configuration, a user may identify a primary-site location, for example, an "at-home" location, an "at-work" location, an "at-school" location or any other primary-site location. The user may also configure parameters used to categorize a mobile-device location as satisfying a primary-site location condition. One exemplary parameter may be a distance tolerance from the primary-site location, for example, the primary-site location condition may be satisfied when a mobile device location is determined to be within a predetermined radius of the primary-site location. The predetermined radius value may be user defined or a default value may used. Another exemplary parameter may be a route-based parameter. For example, a primary-site location condition may be satisfied when a travel trajectory determined for a mobile device is along a predefined automatically assessed route toward the primary-site location.

Another exemplary location condition may be related to a community location condition. During alert configuration, a user may identify a plurality of community locations and/or community regions, for examples, street addresses, business names, neighborhoods, primary-site-based regions and other community location identifiers, associated with an "in-community" location. A community location condition may be met when a mobile device is detected within a distance tolerance of a community location, for example, within a predetermined radius of a community location. The predetermined radius value may be user defined or a default value may used. Another exemplary parameter may be a route-based parameter. For example, a community location condition may be satisfied when a travel trajectory determined for a mobile device is along a predefined our automatically assessed route toward a community location. When a community region is defined, for example, a neighborhood, the community location condition may be met when the mobile device is detected within the community region.

An "out-of-community" location condition may be associated with mobile-device locations that cannot be categorized as primary-site locations or community locations.

The energy controller 114 may comprise a location-determination unit 206. The location-determination unit 206 may request location information associated with a mobile device. In some embodiments of the present invention, location information may comprise GPS coordinates. In some embodiments of the present invention, the request may be effectuated through the energy-monitoring service. In some embodiments of the present invention, a mobile device may periodically transmit location information to an energy controller. In some embodiments of the present invention, the frequency of the transmission may be user settable and may be time-of-day dependent. An exemplary time-of-day dependent frequency is a once per five minutes transmission between 5 am and 7 pm and a once every 30 minute transmission otherwise. In some embodiments of the present invention, the frequency of the transmission may be pre-defined. In some embodiments of the present invention, the transmission may be effectuated through the energy-monitoring service. In some embodiments of the present invention, mobile-device location information may be periodically transmitted to the energy-monitoring service, and stored until a location-information request is sent from the energy controller to the energy-monitoring service. In some embodiments of the present invention, the frequency of the transmission may be user settable and may be time-of-day dependent. In some embodiments of the present invention, the frequency of the transmission may be pre-defined.

In some embodiments of the present invention, the energy-monitoring service may use the mobile device location information, for example, GPS coordinates, to determine a physical map location, for example, a street address, a business name or other map-based information, associated with the mobile device. The physical map location associated with the mobile device location may be transmitted to the location-determination unit 206. In alternative embodiments of the present invention, a physical map location may be determined by the location-determination unit 206 in the energy controller 114. In some embodiments, the location-determination unit 206 may determine the physical map location by requesting a physical map location associated with location information from the energy-monitoring service.

Exemplary methods for GPS coordinate mapping to physical map location may comprise services known in the art, for example, Google Maps API, Yahoo MapQuest API and other mapping services.

In some embodiments of the present invention, location information may comprise travel time from a current location to a predefined primary-site location. In some embodiments of the present invention, location information may comprise travel distance from a current location to a predefined primary-site location.

In some embodiments of the present invention, location information may comprise a travel indicator, for example, "traveling," "walking," "fixed," "driving," "flying" or other indicator associated with a mode or rate of travel. In some embodiments of the present invention, a travel indicator may be determined by comparing a plurality of GPS coordinates obtained over a period of time. For example, no change in GPS coordinates over a period of time may be associated with the travel indicator "fixed." For example, a rate of change in GPS coordinates below a first threshold, but above a second threshold, may be associated with the travel indicator "walking." For example, a rate of change in GPS coordinates above a third threshold may be associated with the travel indicator "traveling." Other ranges of rate of change in GPS coordinates may be indicative of other travel indicators.

An alert generator 208 may determine when an alert condition for generating and transmitting an alert has been met, and the alert generator 208 may generate an alert notification in conjunction with the satisfied alert condition. In some embodiments of the present invention, the energy controller 114 may upload current power-usage information from the current-usage update unit 204 to the energy-monitoring service, and the energy-monitoring service may determine if an alert condition for generating and transmitting an alert has been met.

The energy controller 114 may also comprise a power-state manager 210 for managing the power state of a connected energy-consuming appliance. In some embodiments of the present invention, the power-state manager 210 may be implemented using an energy state command and control service. The energy state command and control service may run on a microcontroller daughter board that may be connected to a serial port of an energy controller mainboard. The energy state command and control service may send energy-state commands, for example, turn on, turn off, reduce power, and other energy-state commands, to a status and control unit.

In some embodiments, an energy-state command may comprise an appliance identifier that uniquely identifies an appliance that is associated with a status and control unit, for example, plugged into the status and control unit.

In some embodiments, when a status and control unit is configured to use X10, the appliance identifier and the energy state may be sent to the status and control unit with a type indicator that identifies the appliance identifier as an X10 type. If an appliance identifier is an X10 type, the status and control unit may construct the bytes for the specific energy-state command in X10 format, as specified in an X10 protocol documentation document. The X10-format data may be sent serially through a digital input/output to the X10 transceiver that is connected to the input/output pins.

The energy controller 114 may also comprise a database 212, wherein profiles, alert configurations, energy-consuming-appliance data and other information required for energy monitoring and control may be stored. In alternative embodiments, the database may be entirely, or partially, maintained within the energy-monitoring service. Exemplary databases may include MySQL, Oracle, CSV flat file and other databases known in the art.

An exemplary database record associated with an energy-consuming device may comprise a plurality of fields. In some embodiments of the present invention, a database record associated with an energy-consuming device may comprise fields for: a universally unique identifier, for example, a globally unique identifier (GUID); an appliance type, for example, lamp, stove, coffer maker, HVAC, and other appliance types; an alias name, which may be optionally used to distinguish between multiple appliances of the same type; a control type, for example, X10, Smart Plug XYZ, and other control types; an appliance identifier, which may indicate the address of the appliance, for example, an X10 address; and a power sample, which may comprise a current power-consumption sample.

Figure 4:
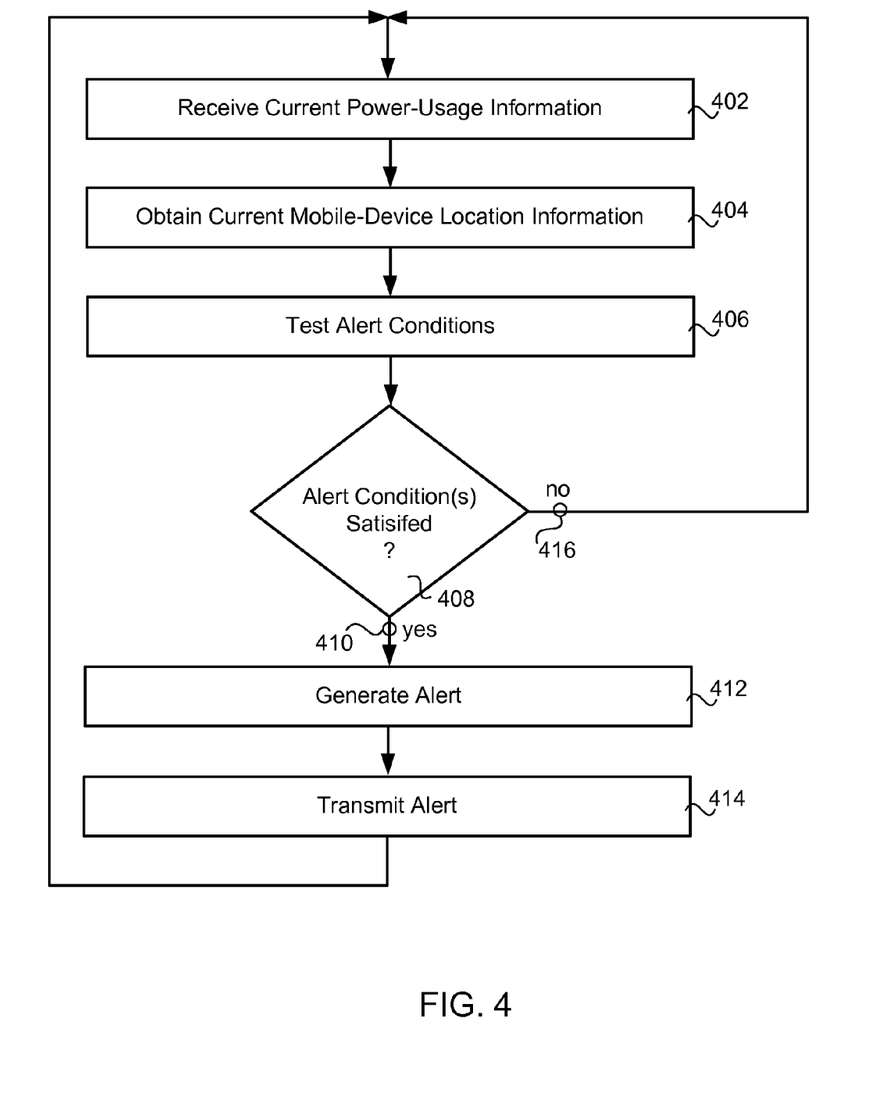
FIG. 4 is a chart illustrating exemplary embodiments of the present invention comprising power-usage information and location information based alert conditions.

Some embodiments of the present invention may be understood in relation to FIG. 4. In these embodiments, an energy-monitoring service may receive 402 current power-usage information from an energy controller. The current power-usage information may be associated with one, or more, energy-consuming appliances controlled by the energy controller. The energy-monitoring service may obtain 404 current mobile-device location information from a mobile device associated with the one, or more, energy-consuming appliances. The energy-monitoring service may test 406 alert conditions associated with the one, or more, energy-consuming appliances.

In some embodiments of the present invention, the alert conditions may be based on the current power usage and on location information associated with the mobile device.

In some embodiments of the present invention, a location category may be determined based on the mobile-device location information. The energy-monitoring service may then examine all alert settings associated with the location category. A determination may be made 408 as to whether, or not, an alert condition is satisfied. When an alert condition is satisfied 410, an alert notification may be generated 412 and transmitted 414 to the mobile device. In some embodiments of the present invention, an alert condition may be satisfied when the mobile-device location information and the current power-usage information meet a first criterion defined in the alert configuration. If an alert condition is not satisfied 416, then the energy-monitoring service may wait to receive current power-usage information.

In alternative embodiments of the present invention, location categories may be tested sequentially. When the current mobile-device location information satisfies a location category, then the alert settings associated with the satisfied location category may be examined.

In alternative embodiments of the present invention, alert conditions may be examined based on power-usage information. If the current power-usage information meets an alert-generating condition, then the current mobile-device location information may be used to determine if the location category for the identified alert is also met.

One of ordinary skill in the art will recognize the multitude of ways of testing alert conditions based on current power-usage information and on current mobile-device location information. The above described order of condition testing is by way of example and not limitation.

In some embodiments of the present invention, an alert notification associated with a satisfied alert condition may be sent to a mobile device. In alternative embodiments of the present invention, a single alert notification may be sent to a mobile device, wherein the single alert notification is the representative of all alerts generated for a sampling period. Wherein the sampling period is associated with a current state of power usage and mobile-device location information.

When an alert notification is sent from an energy-monitoring service to a mobile device, an energy-monitoring-and-control application on the mobile device may generate a display alert, a vibratory alert, an audible alert or a combination of alert types. The energy-monitoring-and-control application may additionally display a plurality of actions associated with the alert. The energy-monitoring-and-control application may receive an input signal indicating one of the plurality of actions, and the energy-monitoring-and-control application may send a request to the energy controller based on the selected action. Exemplary actions may include, a change-mode action, for example, power-down, set to sleep mode, and other change-mode actions associated with changing the energy-consumption mode of an energy-consuming appliance, a forward-alert action, which may, for example, forward the alert to another user, an alert-received acknowledgement action, which may, for example, notify the energy controller that the alert has been acknowledged, and other actions.

In some embodiments of the present invention, an alert notification may be in a form that may be supported by a mobile application. Exemplary alert-notification formats may include a Web service format, SOAP/XML packet format, a HTML/CSS embedded packet with an HTTP body format, and other formats accepted by mobile applications.

An exemplary alert notification represented by an XML packet for an "out-of-community" alert may be:

```
<alert type='out-of-community alert'>
    <appliances>
        <appliance id="..." type="stove" alias="main-kitchen-stove">
            <power-mode>ON</power-mode>
            <power-change-states>
                <power-mode>OFF</power-mode>
            </power-change-states>
        </appliance>
    </appliances>
</alert>
```

The mobile application may process the alert and render an alert notification and user interface on the mobile-device screen. The type of the alert may be displayed. The appliances for which the alert is applicable may be displayed. In some embodiments, the appliances may be identified by appliance type and appliance alias name. In alternative embodiments, the appliances may be identified by their appliance unique identifier in addition to appliance type and appliance alias name. The current power mode state and power usage may be displayed. An activation method to request a change in the power mode state may be displayed. An exemplary activation method may be a button or other user-selectable interface method for selection of a change request, for example, power off, sleep mode, ignore, and other selections.

In some embodiments of the present invention, a default response may be generated after a lack-of-response period of time. In some embodiments of the present invention, the default response may be equivalent to an "ignore" selection.

In some embodiments of the present invention, power-mode states may be supported, wherein the power mode state is associated with a partial reduction, or increase, in power usage. Exemplary states may include a dimming state, a thermostatic temperature change state and other states associated with incremental power-usage change. In some embodiments of the present invention, these power-mode states may be energy-consuming appliance dependent.

A response may be sent from the mobile device to the energy controller. An exemplary response to an alert notification represented by an XML packet may be:

```
<power-change-request userid="...">
    <appliances>
        <appliance id="..." type="stove" alias="main-kitchen-stove">
            <power-mode>OFF</power-mode>
        </appliance>
    </appliances>
</power-change-request>
```

The response may be received by the energy controller, and the power-state manager may generate the appropriate command to send to the status and control unit associated with the energy-consuming appliance to effectuate the selected mode change. The response may be sent through the energy-monitoring service.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for monitoring and controlling energy usage of an energy-consuming appliance, said method comprising:
   receiving energy usage information from a status and control unit associated with an energy-consuming appliance;
   receiving location information from a mobile device associated with said energy-consuming appliance;
   generating an alert notification when a first condition related to said energy usage information and said location information meets a first criterion.

2. A method as described in claim 1, wherein said mobile device is a mobile phone.

3. A method as described in claim 1, wherein said method is performed by an energy controller.

4. A method as described in claim 3, wherein said energy controller comprises:
   an alert-configuration unit;
   a location-determination unit;
   a current power-usage update unit;
   an alert generator; and
   a power-state manager.

5. A method as described in claim 1 further comprising transmitting said alert notification to said mobile device.

6. A method as described in claim 1, wherein said location information comprises GPS coordinates.

7. A method as described in claim 6, further comprising generating physical map information from said GPS coordinates.

8. A method as described in claim 1, wherein said first condition is based on a primary-site location defined in an alert configuration.

9. A method as described in claim 8, wherein said first condition is further based on a distance tolerance associated with said primary-site location.

10. A method as described in claim 8, wherein said first condition is further based on a direction of travel relative to said primary-site location.

11. A method as described in claim 8, wherein said first condition is further based on a rate of travel relative to said primary-site location.

12. A method as described in claim 8, wherein said first condition is further based on a route defined relative to said primary-site location.

13. A method as described in claim 8, wherein said primary-site location is a location selected from the group consisting of a home location, a school location and a work location.

14. A method as described in claim 1, wherein said first condition is based on a community location defined in an alert configuration.

15. A method as described in claim 14, wherein said first condition is further based on a distance tolerance associated with said community location.

16. A method as described in claim 14, wherein said first condition is further based on a direction of travel relative to said community location.

17. A method as described in claim 14, wherein said first condition is further based on a rate of travel relative to said community location.

18. A method as described in claim 14, wherein said first condition is further based on a route defined relative to said community location.

19. A method as described in claim 1, wherein said first condition is based on a rate of travel in relation to a location selected from the group consisting of a primary-site location and a community location, wherein said rate of travel is defined in an alert configuration.

20. A method as described in claim 1, further comprising:
   receiving an energy-state change request associated with said energy-consuming appliance; and
   changing an energy-state of said energy-consuming appliance in accordance with said energy-state change request.

21. A system for monitoring and controlling energy usage of an energy-consuming appliance, said system comprising:
   an energy-consuming appliance;
   a status and control unit associated with said energy-consuming appliance;
   an energy controller comprising a non-transitory computer program product encoded with instructions for implementing a method comprising:
      receiving energy usage information from said status and control unit;
      receiving location information from a mobile device associated with said energy-consuming appliance; and
      generating an alert notification when a first condition related to said energy usage information and said location information is met.

22. A system as described in claim 21, wherein said energy controller comprises:
   an alert-configuration unit;
   a location-determination unit;
   a current power-usage update unit;
   an alert generator; and
   a power-state manager.

* * * * *